United States Patent
Martins

(10) Patent No.: US 11,054,671 B2
(45) Date of Patent: Jul. 6, 2021

(54) OPHTHALMIC LENS IN PARTICULAR FOR A PAIR OF SUNGLASSES

(71) Applicant: BNL EUROLENS, Bellegarde sur Valserine (FR)

(72) Inventor: Sébastien Martins, Bellegarde sur Valserine (FR)

(73) Assignee: BNL EUROLENS, Bellegarde-sur-Valserine (FR)

( * ) Notice: Subject to any disclaimer, the term of this patent is extended or adjusted under 35 U.S.C. 154(b) by 346 days.

(21) Appl. No.: 16/321,400

(22) PCT Filed: Jul. 25, 2017

(86) PCT No.: PCT/EP2017/068765
§ 371 (c)(1),
(2) Date: Jan. 28, 2019

(87) PCT Pub. No.: WO2018/019833
PCT Pub. Date: Feb. 1, 2018

(65) Prior Publication Data
US 2020/0285078 A1  Sep. 10, 2020

(30) Foreign Application Priority Data
Jul. 26, 2016 (FR) ...................................... 1657182

(51) Int. Cl.
*G02C 7/10* (2006.01)

(52) U.S. Cl.
CPC ............. *G02C 7/104* (2013.01); *G02C 7/108* (2013.01)

(58) Field of Classification Search
CPC .......... G02C 7/104; G02C 7/108; G02C 7/12; G02C 2202/16; G02C 7/02; G02C 7/10;
(Continued)

(56) References Cited

U.S. PATENT DOCUMENTS 5,218,386 A * 6/1993 Levien ................. H04N 13/334
351/159.6
5,646,781 A * 7/1997 Johnson, Jr. ........... G02C 7/104
359/589

(Continued)

FOREIGN PATENT DOCUMENTS

| EP | 1580591 | 9/2005 |
| WO | WO 2008/067109 | 6/2008 |
| WO | WO 2013/066493 | 5/2013 |

OTHER PUBLICATIONS

International Search Report and Written Opinion issued in International Patent application No. PCT/EP2017/068765, dated Nov. 21, 2017.

Primary Examiner — Marin Pichler
Assistant Examiner — Henry A Duong
(74) Attorney, Agent, or Firm — Norton Rose Fulbright US LLP

(57) ABSTRACT

The invention relates to an ophthalmic lens (1) for a pair of sunglasses, said ophthalmic lens including at least one substrate (13), the lens (1) having a transmission spectrum such that: the transmittance at wavelengths shorter than 380 nm is lower than 1%; the spectrum includes a first transmittance maximum (MAX-1) having a transmittance higher than 8% between 390 nm and 420 nm; the spectrum includes a first transmittance minimum (MIN-1) between 426 nm and 440 nm; the transmittance between 450 nm and 500 nm is higher than 10%; the spectrum includes between 570 nm and 595 nm a second transmittance minimum (MIN-2); the spectrum includes between 590 nm and 620 nm a second transmittance maximum (MAX-2); the spectrum includes in the wavelength range comprised between 620 nm and 640 nm a third transmittance minimum (MIN-3); the transmittance at wavelengths longer than 640 nm is higher than 14%.

20 Claims, 5 Drawing Sheets

(58) Field of Classification Search
CPC ........ G02C 7/101; G02C 7/102; G02C 7/105; G02C 7/107; G02B 5/3033; G02B 1/08
USPC .................................................. 351/159.65
See application file for complete search history.

(56) References Cited

U.S. PATENT DOCUMENTS

| | | |
|---|---|---|
| 6,612,697 B1 | 9/2003 | Aurelius et al. |
| 2008/0221674 A1 | 9/2008 | Blum et al. |
| 2013/0271725 A1* | 10/2013 | Chiou ...................... G02C 7/10 351/159.56 |
| 2014/0022637 A1* | 1/2014 | Richards .............. G02B 26/008 359/464 |
| 2015/0323812 A1 | 11/2015 | Ishak et al. |

* cited by examiner

OPHTHALMIC LENS IN PARTICULAR FOR A PAIR OF SUNGLASSES

CROSS-REFERENCE TO RELATED APPLICATIONS

This application is a national phase application under 35 U.S.C. § 371 of International Application No. PCT/EP2017/068765 filed 25 Jul. 2017, which claims priority to French Patent Application No. 1657182 filed 26 Jul. 2016. The entire contents of each of the above-referenced disclosures is specifically incorporated by reference herein without disclaimer.

BACKGROUND OF THE INVENTION

1. Field of the Invention

The present invention relates to an ophthalmological lens in particular for sunglasses.

2. Description of Related Art

Wearing sunglasses, in particular when it is very bright outside, is medically recommended to preserve one's long-term vision potential and also for safety reasons, for example when driving.

Specifically, sunglasses form a barrier to UV (ultraviolet) rays. Many studies have shown that UV rays may engender lesions, inflammations or degradation of the cornea, of the crystalline lens or of the retina. In order to avoid these effects and above all a modification of the eye that could decrease vision long-term, people are increasingly encouraged to wear sunglasses in order to avoid exposure to too high a light intensity.

In addition, sunglasses also allow discomfort glare to be combatted, thereby increasing safety when driving or during sporting activities, for example skiing or other potentially risky activities.

For this reason, sunglasses sold at the present time block all radiation of wavelength lower than 400 nm.

However, in the last few years medical studies have demonstrated that a wavelength range of about 430 nm (+/−20 nm), also known as the bad blue, plays an important role for example in age-related macular degeneration (AMD). It is a question of a process that is cumulative over a person's lifetime and that becomes problematic in particular for people older than 60 years old.

To remedy these problems, ophthalmic lenses with filters that are more pronounced in the visible blue portion of the spectrum between 400 nm and 480 nm are known.

However, these known ophthalmic lenses are not entirely satisfactory in so far as a portion of the "good blue" between 450 nm and 480 nm is also substantially attenuated, this degrading the visual spectral perception of the wearer of the sunglasses. In addition, a degradation in the contrast perceived by the user is observed, this possibly having a negative impact on safety, in particular when driving.

This lack of contrast may lead to the wearer of the sunglasses experiencing substantial visual fatigue and may also result in queasiness, or even cause headaches in extreme cases. This decrease in contrast may also lead to difficulties in appreciating perspective in the field of view. For a driver of a vehicle, it is possible that the traffic situation in front of the vehicle will be poorly read, this possibly representing a certain danger to the driver himself and to any other people present.

SUMMARY OF THE INVENTION

The objective of the invention is therefore to provide a an improved ophthalmological lens allowing the drawbacks of the prior art to be at least partially solved.

To this end, the subject of the invention is an ophthalmological lens for sunglasses comprising at least one substrate, at least one of the substrates comprising one or more colorants and/or pigments, said colorants and/or pigments of all the substrates interacting together in order to absorb the light passing through the lens, the lens having a transmission spectrum such that:

- the transmission at wavelengths lower than 380 nm is lower than 1%, in particular 0.03%,
- the spectrum comprises in the wavelength range comprised between 390 nm and 420 nm a first transmission maximum having a transmission higher than 8%,
- the spectrum comprises in the wavelength range comprised between 426 nm and 440 nm a first transmission minimum having a transmission lower than or equal to 10%, in particular lower than or equal to 6%, the transmission of the first minimum being lower than the transmission of the first maximum,
- the transmission in the wavelength range comprised between 450 nm and 500 nm has a transmission higher than 10%, the spectrum comprises in the wavelength range comprised between 570 nm and 595 nm a second transmission minimum having a transmission lower than 10% and preferably lower than 6%,
- the spectrum comprises in the wavelength range comprised between 590 nm and 620 nm a second transmission maximum having a transmission higher than 5% and preferably higher than 8%, the wavelength corresponding to the second transmission maximum being higher than that of the second transmission minimum and the transmittance of the second transmission maximum being higher than that of the second transmission minimum,
- the spectrum comprises in the wavelength range comprised between 620 nm and 640 nm a third transmission minimum having a transmission lower than 15%, the transmittance of the third minimum being lower than the transmittance of the second maximum,
- the transmission at wavelengths higher than 640 nm is higher than 14%.

The ophthalmological lens thus obtained allows light that is potentially dangerous to the eyes of the user of the ophthalmological lens to be stopped while accentuating perceived contrasts.

The ophthalmic lens may furthermore have one or more of the following features, whether alone or in combination.

The spectrum of the ophthalmological lens comprises in the wavelength range comprised between 480 nm and 550 nm a fourth transmission minimum having a transmission lower than 15%, in particular lower than 11%, and preferably 9%.

The fourth transmission minimum is located between 490 nm and 510 nm.

Light is thus cut around the turquoise/emerald color this improving the contrast between blue hues and green hues or indeed between 520 nm and 540 nm thereby allowing the perception of all the other colors other than green to be improved because it is the green color, which is the range in which the eye has the greatest sensitivity, that is cut.

The spectrum comprises in the wavelength range comprised between 440 nm and 480 nm a third transmission maximum having a transmission higher than 15%, preferably 20%, in particular 25%.

This, in conjunction with the first maximum, allows a good perception of blue hues to be maintained despite the cut-off around 430 nm.

The transmission of the third minimum possesses a transmission value lower than or equal to 75%, in particular 66%, of the transmission value of the second transmission maximum.

The transmission of the second transmission minimum is lower than the transmission of the third transmission minimum.

The transmission of the first transmission minimum is lower than or equal to the transmission of the second transmission minimum.

The transmission of the fourth transmission minimum is higher than the transmission of the first and of the second transmission minimum.

The spectrum comprises between the fourth transmission minimum and the second transmission minimum a fourth transmission maximum having a transmission comprised between 10% and 60% and in particular comprised between 10% and 25%.

The width of the absorption peak formed by the first transmission minimum when measured at a transmission value corresponding to twice the transmission value of the first transmission minimum is comprised between 10 nm and 20 nm and preferably is about 15 nm.

The width of the absorption peak formed by the second transmission minimum at a transmission value corresponding to twice the transmission value of the second transmission minimum is comprised between 15 nm and 30 nm and preferably is about 20 nm.

The second transmission minimum and the third transmission minimum are separated by 30 nm to 60 nm and in particular by 45 nm.

The transmission between 440 nm and 480 nm is higher than 20%.

The transmission between 480 nm and 510 nm is comprised between 10% and 40%.

BRIEF DESCRIPTION OF THE DRAWINGS

Other features and advantages of the invention will become more clearly apparent on reading the following description, which is given by way of illustrative and nonlimiting example, and the appended drawings, in which.

DETAILED DESCRIPTION

One example of one embodiment will now be described with reference to the figures.

The following embodiments are examples. Although the description makes reference to one or more embodiments, this does not necessarily mean that each reference relates to the same embodiment, or that the features apply only to one single embodiment. Single features of various embodiments may also be combined to create other embodiments.

The spectral transmittance or transmission in % indicates the ratio in percent between the incident light intensity and the light intensity that passes through an optical element and that is not absorbed, given by:

$$\tau = I(\lambda)/I_0(\lambda) * 100 \text{ where}$$

τ is the transmission or spectral transmittance,
$I_0(\lambda)$ is the light intensity incident at the wavelength λ,
$I(\lambda)$ is the light intensity received at the wavelength λ after having passed through the optical element.

The expression "inclusive" is understood to mean that the one or more limits is/are also comprised in the range. For example, a length between "425 nm and 445 nm inclusive" is understood to mean a wavelength range that comprises the limits ([425 nm, 445 nm]) of the wavelength range thus defined. A range extending from a wavelength higher than or equal to 425 nm to a wavelength lower than or equal to 445 nm is thus defined. Generally, in the present description, unless expressly mentioned otherwise, wavelength ranges or peak widths are considered to be inclusive of limits.

In the present description, the terms first, second, third and fourth maximum or minimum are used by way of example. They are simply denominations and their order has no bearing on their location in terms of wavelength or to their transmittance value or of their peak width.

In the present description, the words transmission and transmittance are used as synonyms having the same meaning.

Figure 1:
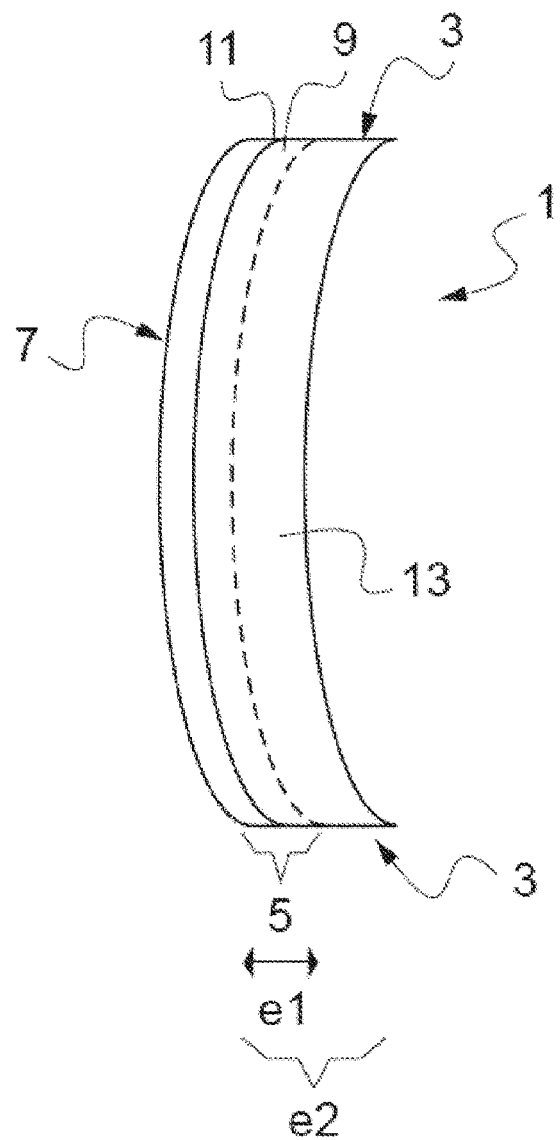
FIG. 1 is a schematic cross-sectional view of an example embodiment of an ophthalmic lens 1 according to the invention.

The ophthalmic lens 1 of FIG. 1 is tinted and for example intended to be used in a pair of spectacles, in particular a pair of sunglasses. To do this, it is only necessary to machine the external edge 3 to the desired shape of the rim of the frame.

By ophthalmic lens what is meant is a finished or semi-finished, corrective or non-corrective lens able to be mounted in a frame, for example a spectacle frame, goggles or a visor intended to be placed in front of the eyes and forming a visual protective screen.

The ophthalmic lens may be made of mineral glass or of organic glass or of a combination of both mineral glass and organic glass.

The ophthalmic lens may have a tint gradient, and it may comprise other solar functions such as a polarizing function and/or a photochromic function. The ophthalmic lens is for example of class 2, 3 or 4, and preferably 2 or 3 according to standard ISO 12312.

It may also comprise other additional functions, whether alone or in combination, from the following nonexhaustive list: shock resistance, scratch resistance, wear resistance, anti-reflection, mirror-finish, smudge resistance, anti-fog, antistatic. These additional functions may be produced using conventional methods (dip coating, vacuum deposition, spin coating, spray coating, etc.).

The tinted ophthalmic lens 1 shown in FIG. 1 comprises a polarizing assembly 5 composed of at least a first layer 7 and a second layer 9 of a thermoplastic or thermoset sandwiching a polarizing film 11. Of course, this polarizing assembly 5 with its layers 5, 7 and 9 is optically transparent, i.e. it lets light pass.

According to one variant (not shown) an ophthalmic lens may not comprise a polarizing assembly 5.

As may be seen in FIG. 1, the ophthalmic lens 1 furthermore comprises at least one third layer forming a substrate 13 that is made of a colored or tinted transparent thermoplastic, polycarbonate for example, and that is made to adhere to the second layer 9 by injection molding.

According to one variant, the ophthalmological lens includes a plurality of substrates or layers each including one or more colorants. The colorants of all the substrates interact together in order to absorb the light passing through the lens 1 in order to obtain a transmission spectrum such as will be described below.

By way of example, the polarizing assembly 5 possesses thickness e1 comprised between 0.3 and 1 mm and the third layer forming the substrate 13 possesses a thickness e2 comprised between 0.5 and 2 mm.

The polarizing film is for example a film of polyvinyl alcohol (PVA), which is known for its polarizing properties.

When used in spectacles or sunglasses, the layer 13 will be the layer intended to be closest to the eye of the user and the layer 7 the layer furthest from the eye of the user.

According to one variant (not shown) to produce a semi-finished lens a crystal thermoplastic layer may be placed against the layer 13 in order to be machined for a final user in order to tailor the ophthalmic lens to the site thereof. In this case, it is this crystal layer that is intended to be closest to the eye of the user.

As mentioned above, the two layers 7, 9 may be made from a thermoplastic or thermoset and the layer 13 may be made from a thermoplastic.

More generally, the material or materials of certain layers of the ophthalmic lens 1 may be any material commonly used in the field of optics and in particular in the ophthalmic field.

It is for example possible to choose a thermoplastic from the following nonexhaustive group: polymethyl (meth)acrylate, polycarbonate, polycarbonate/polyester blends, polyamide, polyester, cyclic olefin copolymers, polyurethane, polysulfone, cellulose triacetate (CTA), polyimide, polyurethanes; polyethylene terephthalate and polymethyl methacrylate (PMMA) and copolymers and a combination thereof.

It is for example possible to choose a thermoset from the following nonexhaustive group: cellulose acetate butyrate (CAB), ethylene/norbornene copolymers or ethylene/cyclopentadiene copolymers; (homo and copolymers of allylic carbonates of aliphatic or aromatic linear or branched polyols, such as homopolymers of diethylene glycol bis(allyl carbonate) (CR 39®); (homo and copolymers of methacrylic acid and esters, which may be derivatives of bisphenol A; (polymers and copolymers of thiomethacrylic acid and esters, (polymers and copolymers of urethane and thiourethane), (polymers and copolymers of epoxy), (polymers and copolymers of sulfides and epi sulfides) and combinations thereof.

To color the thermoplastic, it is possible to add pigments or colorants. Regarding pigments, the latter may be organic or mineral pigments.

Figure 2:
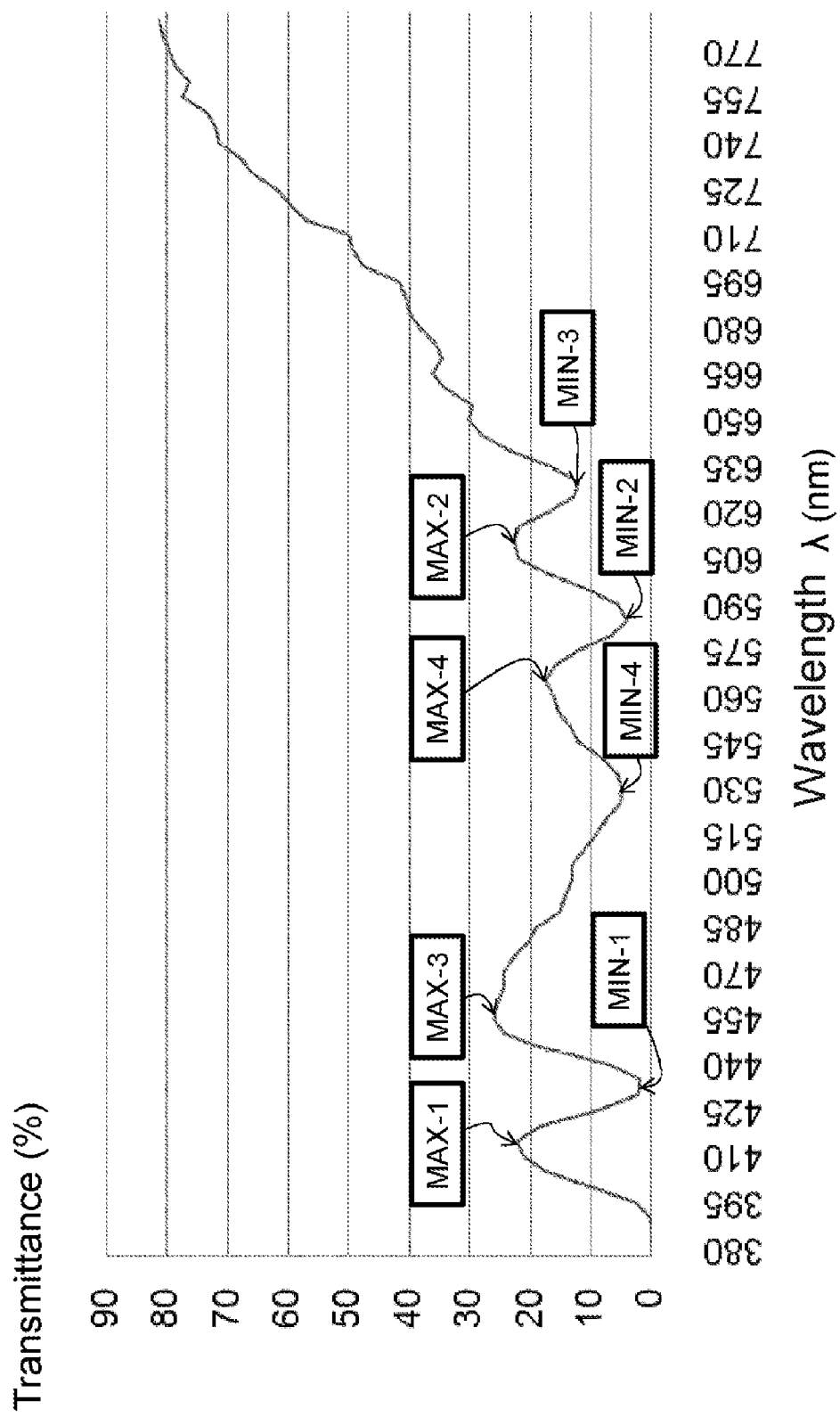
FIGS. 2 to 5 show examples of transmission spectra of lenses according to the invention, the example of FIG. 5 being without polarizing assembly.

In the present case, the substrate formed by the layer 13 includes a plurality of colorants and/or pigments that interact together in order to absorb the light passing through the lens, the lens having a transmission spectrum such as may be seen, for example, in FIG. 2, which shows a transmission spectrum of an example ophthalmological lens according to the invention.

The colorants or pigments may however be added to other components of the lens 1, for example the other layers 7, 9, 11 so that their superposition has overall the sought-after spectrum.

In the present description, the terms substrate must be understood in a broad sense and comprises any optically transparent material into which it is possible to incorporate a pigment or a colorant.

FIG. 2 shows the transmittance, or transmission, in percent of light passing through the lens 1 as a function of wavelength λ (lambda). The x-axis is graduated in nanometers (nm), in a range from 380 nm to 780 nm, this corresponding approximately to the spectral range that is visible to the human eye.

In FIG. 2 it may be seen that the spectrum comprises, in the wavelength range lower than about 380 to 390 nm, a very low transmission lower than 1%, in particular a value lower than 0.03%. This property makes it possible to ensure that the transmission of light below 308 nm (UV), which may damage the retina, is minimal.

It may therefore be observed that the transmission at wavelengths at 400 nm is cut. By this what is meant is that the transmission or transmittance is therefore lower than 1%. From 390 nm to 420 nm the spectrum has a first transmission peak MAX-1 having a transmittance ranging up to more than 20%, here precisely 22.15% at 415 nm. This first transmission peak has, by way of example, a width at half-maximum of 25 nm.

More generally, the transmission of the first transmission peak MAX-1 may be higher than or equal to 8% in the wavelength range comprised between 390 nm to 420 nm, this allowing a good perception of the blue-violet colors corresponding to this spectral range to be preserved. The maximum value of the first transmission peak MAX-1 is lower than 70% and in particular lower than 50%.

The ophthalmic lens 1 may belong to class 2, and in particular to class 3 according to standard ISO 12312.

The transmission spectrum then comprises a first transmission minimum MIN-1 comprised between 426 nm and 440 nm having a transmission lower than or equal to 10%, in particular lower than or equal to 6%, the transmission of the first minimum (MIN-1) being lower than the transmission of the first maximum (MAX-1).

In the present example, this first minimum MIN-1 is, in FIG. 2, located at about 435 nm, and has a transmission of 1.84%.

The width of the first minimum MIN-1 measured at twice its minimum value of 2% is about 10 nm. In other words, for a minimum here descending to 2%, the spectral separation between the points of the curve at which the transmission is at 2×1.84%=3.68% to the left and to the right of the minimum (here 427 nm and 437 nm in FIG. 2, respectively) is observed.

This first minimum MIN-1 allows the blue spectral component that causes long-term harm, known as the bad blue, which plays a substantial role for example in age-related macular degeneration (AMD), to be removed.

The absorption peak formed by the first transmission minimum MIN-1 may generally have a spectral width at twice its minimum transmission value of about 10 to 20 nm and preferably of about 15 nm.

Next the transmission increases to reach between 450 nm and 500 nm a transmission level higher than 10% in order to allow a good perception of the blue colors in this wavelength range. Between 450 nm and 500 nm, the transmission or transmittance is lower than 70% and in particular lower than 50%.

It will in addition be observed that the spectrum comprises, in the wavelength range comprised between 570 nm and 595 nm, a second minimum MIN-2 having a transmission lower than 10% and in particular lower than 6%. In the case of FIG. 2, the minimum is located at 585 nm with a transmittance of 4.20%.

The absorption peak thus formed about the second minimum MIN-2 has a width at twice its minimum value of about 15 nm.

Generally, the second minimum MIN-2 possesses a spectral width measured at twice its minimum transmission value of about comprised between 15 to 30 nm, and preferably about 20 nm.

Between 590 nm and 620 nm, the spectrum has a second transmission maximum MAX-2 having a transmittance higher than 5% and preferably higher than 8%, the wavelength corresponding to the second transmission maximum MAX-2 being higher than that of the second transmission minimum MIN-2 and the transmittance of the second transmission maximum MAX-2 being higher than that of the second transmission minimum MIN-2.

In the present case, the second maximum is located at 610 nm and possesses a transmittance of 22.93%. This second maximum MAX-2 has a width at half-maximum of about 30 nm.

Between 620 nm and 640 nm, the spectrum has a third transmission minimum MIN-3 with a transmission lower than 15%. The transmittance of the third minimum MIN-3 is of course lower than the transmittance of the second maximum MAX-2.

More precisely, the third minimum is located at about 630 nm and has a transmittance of 12.12%, and possesses a width at twice the minimum value of about 15 nm.

Moreover, the transmission of the third minimum MIN-3 is lower than 75%, and in particular 66%, of the transmission value of the second transmission maximum MAX-2, i.e. the transmission value of the third minimum MIN-3 is lower than ¾, and in particular 2/3, of the transmission value of the second maximum MAX-2.

In the present case, given that the transmission value of the third minimum is 12.12% and the transmission value of the second maximum is 22.93%, the transmission value of the third minimum MIN-3 is again only 53% of the transmission value of the second maximum MAX-2.

Furthermore, the transmission value of the first minimum MIN-1 is lower than or equal to the transmission value of the second minimum MIN-2, 1.84% and 4.20% in the case of FIG. 2, respectively.

The transmission value of the second minimum MIN-2 is lower than or equal to the transmission value of the third minimum MIN-3, about 4.20% and 12.12% in the case of FIG. 2, respectively.

The second transmission minimum MIN-2 and the third transmission minimum MIN-3 are advantageously separated by about 30 nm to 60 nm and in particular by 45 nm.

In particular, in the case of FIG. 2, the second minimum MIN-2 is located toward 585 nm and the third minimum MIN-3 is located at 630 nm—they are therefore separated by 45 nm.

For wave lengths beyond 640 nm, the transmission increases with the wavelength and is chosen so that it is higher than 14% for wavelengths higher than 640 nm.

In the case of FIG. 2, the transmission at 640 nm is again 24% to reach 50% at between 705 nm and 710 nm then about 75% and more from 750 nm.

The embodiment of FIG. 2 also comprises a fourth transmission minimum MIN-4, which is generally located between 480 nm and 550 nm, preferably between 490 nm and 510 nm or indeed between 520 nm and 540 nm with a transmission lower than 15% in particular lower than 11% and preferably lower than 9%.

In FIG. 2, this fourth transmission minimum MIN-4 has a transmission of 4.85% at 530 nm.

Between 480 and 510 nm, the transmission is generally comprised in the case of FIG. 2 between 10 and 21%.

The transmission value of the fourth minimum MIN-4 is generally higher than the minimum transmission value of the first and second minima MIN-1, MIN-2. Specifically, in FIG. 2, the transmission value of the fourth minimum MIN-4 is 4.85% at 530 nm, and those of the first and second minimum MIN-1, MIN-2 are 2.21% at 430 nm and 4.20% at 585 nm, respectively.

In the embodiment of FIG. 2, the spectrum furthermore comprises a third transmission maximum MAX-3, generally having a maximum transmission value higher than 15%, preferably than 20% and in particular 25% and located in the wavelength range between 440 nm and 480 nm.

In the present case the third maximum MAX-3 is located at 455 nm with a transmission of 26.09%.

The spectral domain located between about 500 and 600 nm (green to yellow color) corresponds to a perception maximum of the human eye. In this spectral domain, contrasts are generally quite well perceived. A transmission comprised between 10 and 20%, and more generally between 5 and 50%, corresponding to the simple attenuation of general luminosity in the context of sunglasses, may be used.

The invention makes provision, in one embodiment, for the spectrum to comprise, in addition or alternatively to the fourth minimum MIN-4, a fourth maximum MAX-4, which is located between the fourth minimum MIN-4 and the second minimum MIN-2. This fourth maximum MAX-4 thus comprises a transmission value higher than the transmission value of the second minimum MIN-2 and fourth minimum MIN-4.

Generally, the transmittance of the fourth minimum MIN-4 is lower than that of the third maximum MAX-3 and than that of the fourth maximum MAX-4.

Thus, in the wavelength range comprised between 400 nm and 500 nm, the transmittance is higher than the transmittance of the first minimum MIN-1.

The transmission of the fourth maximum MAX-4 is generally comprised between 10% and 60% and in particular comprised between 10% and 25%.

Generally, the transmittance of the fourth maximum or MAX-4 is higher than that of the second minimum MIN-2 and than that of the fourth minimum MIN-4.

In the present example of FIG. 2, the fourth maximum MAX-4 is located at 565 nm with a transmission of 18%.

In this embodiment, the fourth maximum has a width at half-maximum of about 40 nm, which is larger than the three other maxima of FIG. 2. This peak is broader than the other maxima MAX-1, MAX-2 and MAX-3.

A lens 1 in particular with a tinted or colored transparent substrate 13 having a spectrum according to FIG. 2 allows a better perception of colors, and therefore of volumes, while removing spectral components that may be harmful to the user. This improvement in contrasts in particular allows the safety of the user when he is driving a vehicle or practicing a winter sport on snow under potentially dazzling sunny conditions to be improved.

Figure 3:
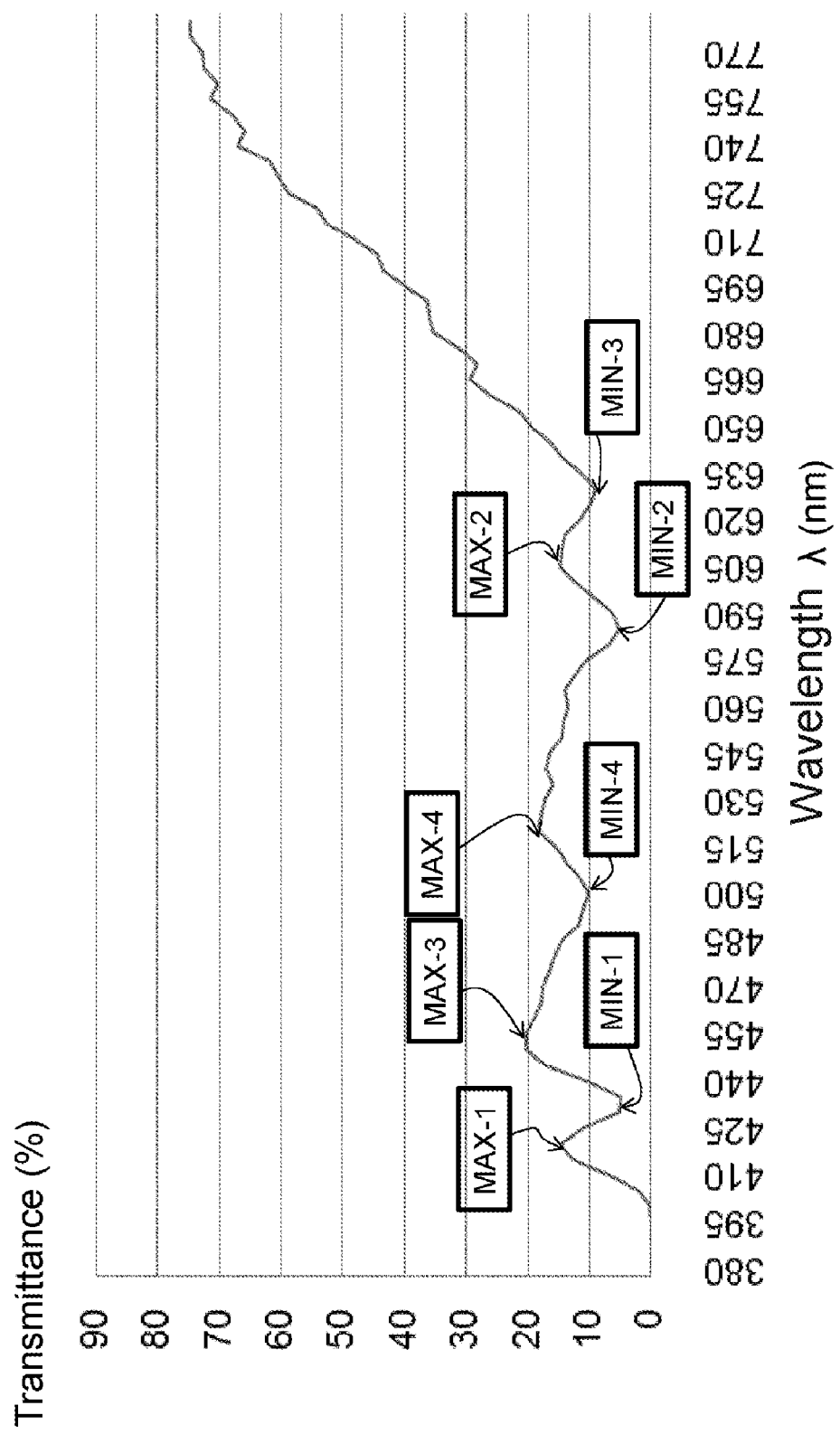
Figure 4:
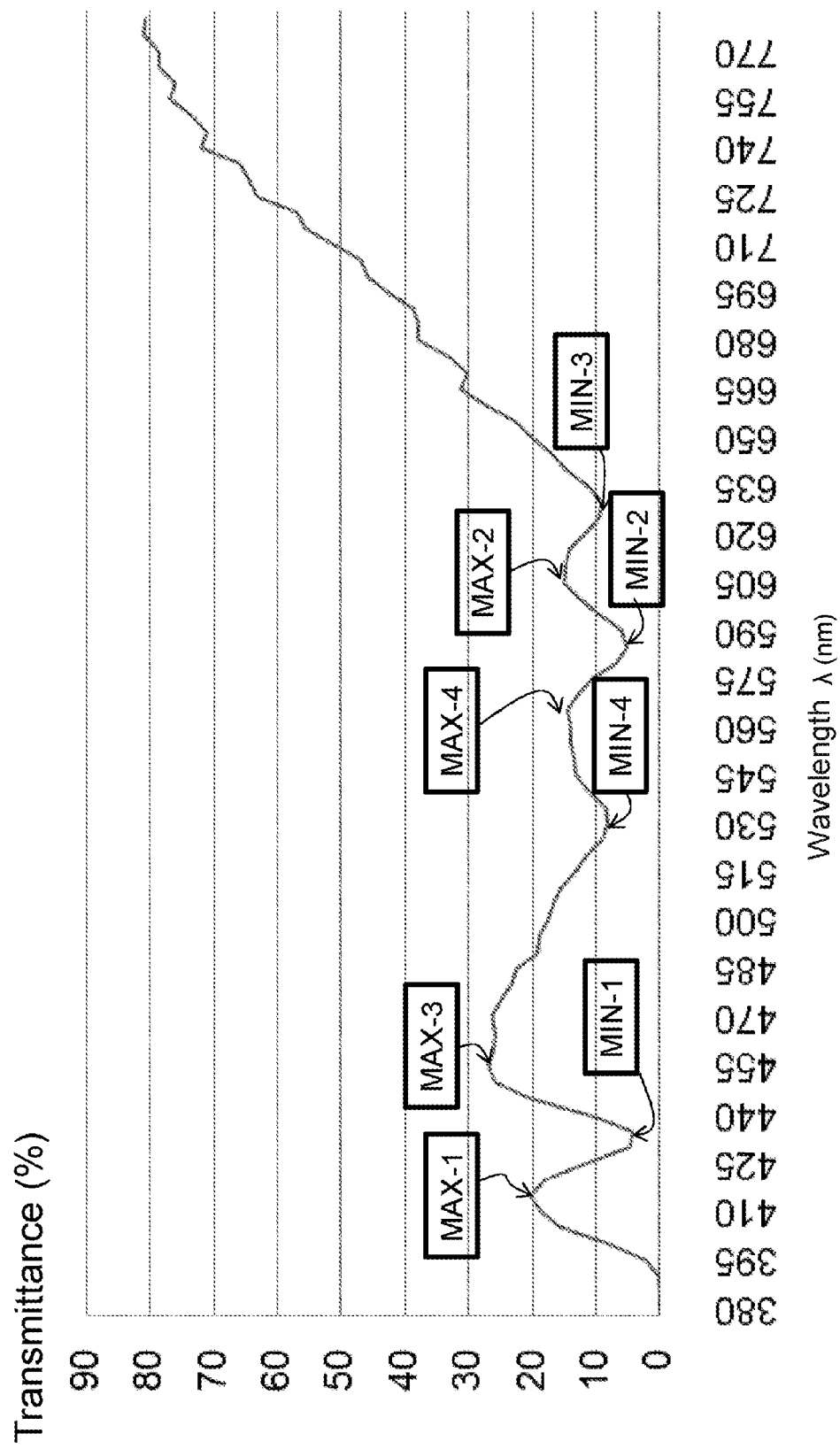
Figure 5:
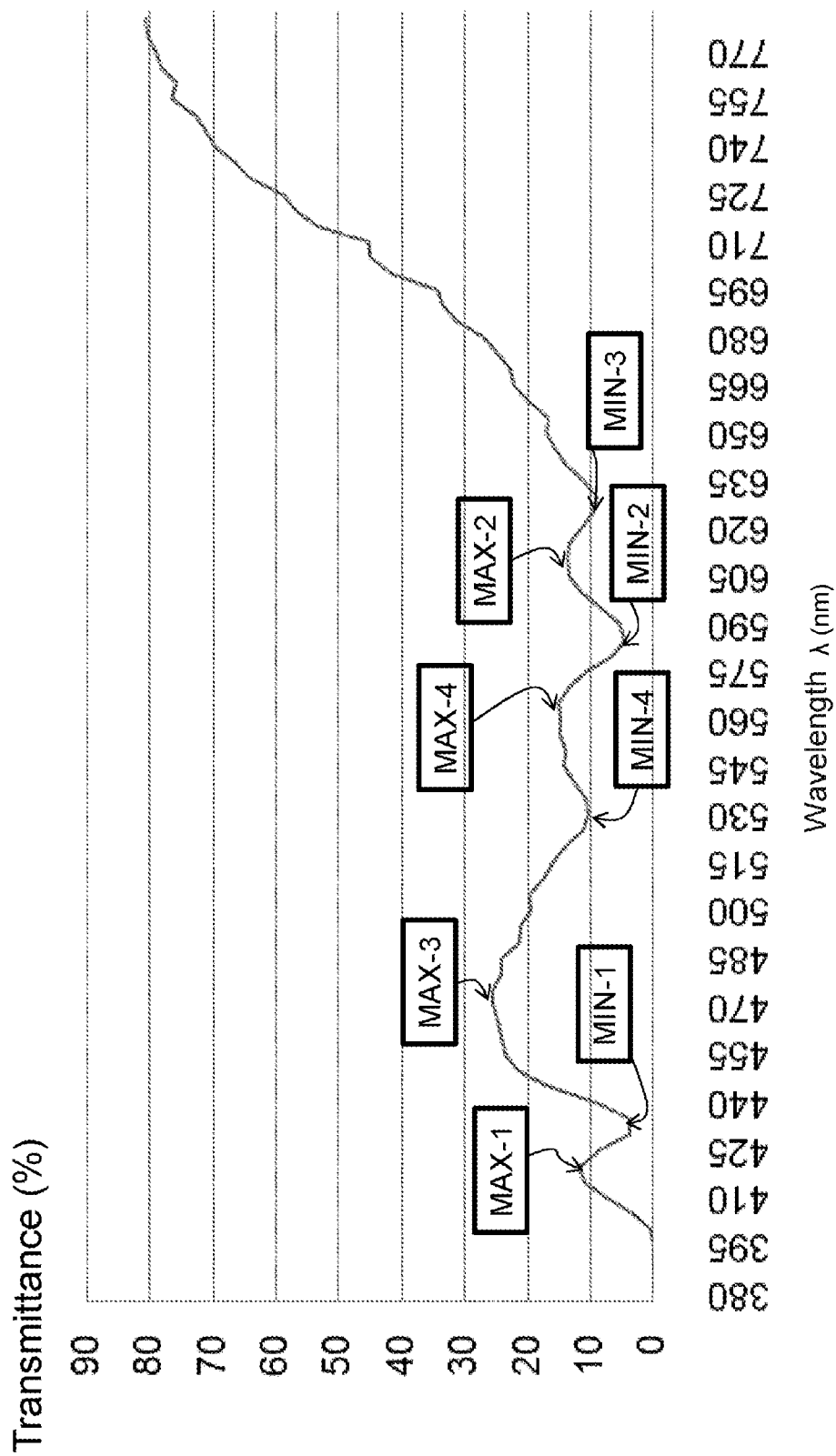

FIGS. 3, 4 and 5 shows three other embodiments of transmission spectra for an ophthalmic lens 1 according to the invention. These three transmission spectra have the same general features as the spectrum of FIG. 2. These spectra of FIGS. 3, 4 and 5 allow on the one hand the tint of the lens 1 perceived by a user to be modified and on the other hand certain wavelength ranges in transmission to be accentuated in transmission. It is thus possible to obtain spectacles or sunglasses that attenuate the perceived luminosity differently, for example intensitywise for relatively dark sunglasses.

More specifically, for the spectrum of FIG. 3, the following table allows the various maxima and minima to be located in their order of appearance from the shortest wavelengths to the longest wavelengths:

| Extrema | Location in wavelength (nm) | Transmission value (%) | Width at half-maximum for a maximum/width at twice its height for a minimum (nm) |
|---|---|---|---|
| MAX-1 | 420 | 14.89 | 25 |
| MIN-1 | 435 | 4.98 | 15 |
| MAX-3 | 455 | 20.37 | — |
| MIN-4 | 500 | 10.15 | — |
| MAX-4 | 520 | 18.52 | — |
| MIN-2 | 585 | 5.20 | 20 |
| MAX-2 | 605 | 14.79 | 35 |
| MIN-3 | 630 | 9.07 | — |

In the wavelength range lower than 390 nm, the transmission is lower than 0.03%.

The light is thus cut about the turquoise/emerald color, this improving contrast between blue hues and green hues.

The transmission at 640 nm is 14.64% to reach 44.63% at 705 nm then about 75% and more from the 775 nm.

In the present case, given that the transmission value of the third minimum MIN-3 is 9.07% and the transmission value of the second maximum is 14.79%, the transmission value of the third minimum MIN-3 is 62% of the transmission value of the second maximum MAX-2.

Furthermore, the transmission value of the first minimum MIN-1 is lower than or equal to the transmission value of the second minimum MIN-2, 4.98% and 5.20% in the case of FIG. 3, respectively.

Furthermore the transmission value of the second minimum MIN-2 is lower than or equal to the transmission value of the third minimum MIN-3, 5.20% and 9.07% in FIG. 3, respectively.

The second transmission minimum MIN-2 and the third transmission minimum MIN-3 are separated by about 45 nm.

In particular, in the case of FIG. 3, the second minimum MIN-2 is located toward 585 nm and the third minimum MIN-3 is located at 630 nm-they are therefore separated by 45 nm.

Regarding the spectrum of FIG. 4, the following table allows the various maxima and minima to be located in their order of appearance from the shortest wavelengths to the longest wavelengths:

| Extrema | Location in wavelength (nm) | Transmission value (%) | Width at half-maximum for a maximum/width at twice its height for a minimum (nm) |
|---|---|---|---|
| MAX-1 | 415 | 20.23 | 35 |
| MIN-1 | 435 | 4.46 | 20 |
| MAX-3 | 455 | 27.00 | — |
| MIN-4 | 530 | 8.27 | — |
| MAX-4 | 565 | 14.55 | — |
| MIN-2 | 585 | 5.18 | 20 |
| MAX-2 | 605-610 | 14.99 | 35 |
| MIN-3 | 630 | 9.11 | — |

In the wavelength range lower than 390 nm, the transmission is lower than 0.03%.

The transmission at 640 nm is 14.93% to reach about 47% at 705 nm then about 77% and more from 755 nm.

In the present case, given that the transmission value of the third minimum MIN-3 is 9.11% and the transmission value of the second maximum is 14.87%, the transmission value of the third minimum MIN-3 is 61% of the transmission value of the second maximum MAX-2.

Furthermore, the transmission value of the first minimum MIN-1 is lower than or equal to the transmission value of the second minimum MIN-2, 4.46% and 5.18% in the case of FIG. 4, respectively.

Furthermore, the transmission value of the second minimum MIN-2 is lower than or equal to the transmission value of the third minimum MIN-3, 5.18% and 9.11% in FIG. 4, respectively.

The second transmission minimum MIN-2 and the third transmission minimum MIN-3 are separated by about 45 nm.

In particular, in the case of FIG. 4, the second minimum MIN-2 is located toward 585 nm and the third minimum MIN-3 is located at 630 nm—they are therefore separated by 45 nm.

Regarding the spectrum of FIG. 5, the following table allows the various maxima and minima to be located in their order of appearance from the shortest wavelengths to the longest wavelengths:

| Extrema | Location in wavelength (nm) | Transmission value (%) | Width at half-maximum for a maximum/width at twice its height for a minimum (nm) |
|---|---|---|---|
| MAX-1 | 420 | 11.91 | 30 |
| MIN-1 | 435 | 3.73 | 15 |
| MAX-3 | 470 | 25.57 | — |
| MIN-4 | 530 | 10.51 | — |
| MAX-4 | 565 | 15.12 | — |
| MIN-2 | 585 | 4.60 | 20 |
| MAX-2 | 605-610 | 13.81 | 35 |
| MIN-3 | 630 | 9.09 | — |

In the wavelength range lower than 390 nm, the transmission is lower than 0.03%.

The transmission at 640 nm is 14.01% to reach 45.13% at 705 nm then about 76% and more from 755 nm.

In the present case, given that the transmission value of the third minimum MIN-3 is 9.09% and the transmission value of the second maximum is 13.81%, the transmission value of the third minimum MIN-3 is 66% of the transmission value of the second maximum MAX-2.

Furthermore, the transmission value of the first minimum MIN-1 is lower than or equal to the transmission value of the second minimum MIN-2, 3.73% and 4.60% in the case of FIG. 4, respectively.

Furthermore, the transmission value of the second minimum MIN-2 is lower than or equal to the transmission value of the third minimum MIN-3, 4.60% and 9.09% in FIG. 5, respectively.

The second transmission minimum MIN-2 and the third transmission minimum MIN-3 are separated by about 45 nm.

In particular, in the case of FIG. 5, the second minimum MIN-2 is located toward 585 nm and the third minimum MIN-3 is located at 630 nm—they are therefore separated by 45 nm.

The lenses 1 according to the invention therefore allow spectacles and in particular sunglasses to be obtained that allow the blue spectral range that is harmful to the retina to be removed while improving the perception of colors and volumes in potentially dazzling situations.

The following table provides the graphical data of FIGS. 2 to 5 in numerical form

| Lambda (nm) | FIG. 2 Transmission (%) | FIG. 3 Transmission (%) | FIG. 4 Transmission (%) | FIG. 5 Transmission (%) |
|---|---|---|---|---|
| 380 | 0.00 | 0.02 | 0.01 | 0.01 |
| 385 | 0.01 | 0.00 | 0.00 | 0.01 |
| 390 | 0.14 | 0.02 | 0.18 | — |
| 395 | 2.59 | 0.01 | 2.22 | 0.02 |
| 400 | 10.15 | 0.15 | 8.51 | 0.50 |
| 405 | 17.55 | 2.14 | 15.58 | 3.18 |
| 410 | 21.03 | 6.97 | 18.79 | 7.54 |
| 415 | 22.15 | 12.54 | 20.23 | 10.96 |
| 420 | 18.27 | 14.89 | 18.22 | 11.91 |
| 425 | 8.61 | 10.93 | 11.23 | 8.46 |
| 430 | 2.21 | 5.30 | 4.59 | 3.78 |
| 435 | 1.84 | 4.98 | 4.46 | 3.73 |
| 440 | 7.13 | 10.24 | 11.01 | 9.14 |
| 445 | 17.93 | 17.30 | 20.66 | 16.98 |
| 450 | 24.44 | 20.30 | 25.71 | 21.60 |
| 455 | 26.09 | 20.37 | 27.00 | 23.68 |
| 460 | 25.47 | 18.87 | 25.99 | 24.30 |
| 465 | 24.46 | 17.85 | 25.95 | 24.73 |
| 470 | 24.36 | 17.70 | 26.30 | 25.57 |
| 475 | 22.88 | 16.53 | 24.99 | 25.46 |
| 480 | 20.42 | 15.55 | 23.47 | 24.20 |
| 485 | 18.88 | 14.60 | 22.61 | 24.14 |
| 490 | 15.07 | 11.81 | 19.15 | 21.33 |
| 495 | 14.41 | 10.92 | 18.94 | 21.04 |
| 500 | 13.05 | 10.15 | 17.45 | 19.55 |
| 505 | 13.14 | 11.63 | 16.88 | 19.76 |
| 510 | 11.24 | 13.69 | 15.58 | 17.68 |
| 515 | 9.11 | 15.74 | 13.16 | 15.82 |
| 520 | 7.38 | 18.52 | 11.50 | 14.11 |
| 525 | 5.20 | 17.97 | 9.10 | 11.13 |
| 530 | 4.85 | 17.17 | 8.27 | 10.51 |
| 535 | 5.69 | 15.89 | 8.59 | 10.81 |
| 540 | 8.54 | 17.15 | 11.18 | 12.75 |
| 545 | 11.97 | 16.59 | 13.27 | 14.22 |
| 550 | 13.38 | 14.43 | 13.54 | 13.88 |
| 555 | 15.39 | 14.36 | 14.08 | 14.71 |
| 560 | 16.26 | 13.59 | 13.97 | 14.79 |
| 565 | 17.61 | 14.12 | 14.55 | 15.12 |
| 570 | 15.90 | 12.50 | 12.98 | 13.59 |
| 575 | 12.21 | 10.47 | 10.72 | 10.71 |
| 580 | 6.53 | 6.84 | 6.89 | 6.67 |
| 585 | 4.20 | 5.20 | 5.18 | 4.60 |
| 590 | 5.75 | 6.20 | 6.17 | 5.57 |
| 595 | 10.97 | 9.32 | 9.48 | 8.52 |
| 600 | 17.37 | 12.34 | 12.55 | 11.59 |
| 605 | 21.99 | 14.79 | 14.99 | 13.54 |
| 610 | 22.93 | 14.67 | 14.87 | 13.81 |
| 615 | 21.87 | 13.97 | 14.24 | 13.48 |
| 620 | 17.09 | 11.64 | 11.75 | 11.43 |
| 625 | 12.98 | 9.75 | 9.69 | 9.66 |
| 630 | 12.12 | 9.07 | 9.11 | 9.09 |
| 635 | 17.19 | 11.49 | 11.56 | 11.37 |
| 640 | 23.63 | 14.64 | 14.93 | 14.01 |
| 645 | 27.91 | 16.54 | 16.99 | 15.60 |
| 650 | 30.30 | 19.45 | 20.07 | 17.05 |
| 655 | 29.69 | 21.55 | 22.47 | 16.79 |
| 660 | 34.10 | 26.40 | 27.54 | 19.96 |
| 665 | 36.33 | 29.51 | 31.31 | 22.25 |
| 670 | 34.58 | 28.37 | 30.11 | 22.81 |
| 675 | 35.80 | 31.02 | 32.86 | 24.80 |
| 680 | 38.34 | 35.39 | 37.83 | 27.28 |
| 685 | 40.22 | 35.89 | 37.96 | 31.32 |
| 690 | 40.72 | 36.31 | 38.68 | 33.41 |
| 695 | 41.76 | 39.93 | 42.60 | 34.34 |
| 700 | 47.49 | 43.49 | 45.97 | 41.43 |
| 705 | 49.51 | 44.63 | 46.98 | 45.13 |
| 710 | 49.93 | 48.14 | 51.30 | 45.39 |
| 715 | 57.23 | 52.86 | 55.84 | 53.57 |
| 720 | 59.53 | 54.18 | 56.83 | 56.99 |
| 725 | 61.72 | 58.76 | 63.06 | 58.76 |
| 730 | 65.92 | 60.53 | 64.55 | 64.27 |
| 735 | 67.82 | 61.77 | 65.82 | 66.36 |
| 740 | 71.43 | 66.92 | 72.02 | 69.78 |
| 745 | 72.04 | 65.92 | 71.07 | 71.17 |
| 750 | 73.48 | 67.91 | 73.24 | 72.69 |
| 755 | 77.54 | 71.36 | 76.92 | 76.69 |
| 760 | 76.39 | 70.44 | 76.22 | 75.94 |
| 765 | 78.60 | 72.65 | 78.66 | 78.28 |
| 770 | 79.77 | 72.70 | 78.68 | 79.21 |
| 775 | 80.86 | 74.68 | 81.05 | 80.42 |
| 780 | 81.21 | 74.68 | 80.74 | 80.87 |

The invention claimed is:

1. An ophthalmological sunglass lens comprising at least one substrate comprising one or more colorant and/or pigment, wherein the one or more colorant and/or pigment of the at least one substrate acts, either alone or with at least one additional colorant or pigment comprised in the at least one substrate and/or additional substrates comprised in the lens, to absorb light passing through the lens such that the lens has a transmission spectrum wherein:

the transmission at wavelengths lower than 380 nm is lower than 1%;
the spectrum comprises in the wavelength range comprised between 390 nm and 420 nm a first transmission maximum (MAX-1) having a transmission higher than 8%;
the spectrum comprises in the wavelength range comprised between 426 nm and 440 nm a first transmission minimum (MIN-1) having a transmission lower than or equal to 10%, the transmission of the first minimum (MIN-1) being lower than the transmission of the first maximum (MAX-1);
the transmission in the wavelength range comprised between 450 nm and 500 nm has a transmission higher than 10%, the spectrum comprises in the wavelength range comprised between 570 nm and 595 nm a second transmission minimum (MIN-2) having a transmission lower than 10%;
the spectrum comprises in the wavelength range comprised between 590 nm and 620 nm a second transmission maximum (MAX-2) having a transmission higher than 5%, the wavelength corresponding to the second transmission maximum (MAX-2) being higher than that of the second transmission minimum (MIN-2) and the transmittance of the second transmission maximum (MAX-2) being higher than that of the second transmission minimum (MIN-2);
the spectrum comprises in the wavelength range comprised between 620 nm and 640 nm a third transmission minimum (MIN-3) having a transmission lower than 15%, the transmittance of the third minimum (MIN-3) being lower than the transmittance of the second maximum (MAX-2); and
the transmission at wavelengths higher than 640 nm is higher than 14%.

2. The lens of claim 1, wherein the transmission at wavelengths lower than 380 nm is lower than 0.03%.

3. The lens of claim 1, wherein the spectrum comprises in the wavelength range comprised between 426 nm and 440 nm a first transmission minimum (MIN-1) having a transmission lower than or equal to 6%.

4. The lens of claim 1, wherein the spectrum comprises in the wavelength range comprised between 570 nm and 595 nm a second transmission minimum (MIN-2) having a transmission lower than an 6%.

5. The lens of claim 1, wherein the spectrum comprises in the wavelength range comprised between 590 nm and 620 nm a second transmission maximum (MAX-2) having a transmission higher than 8%.

6. The lens of claim 1, wherein the spectrum comprises in the wavelength range comprised between 480 nm and 550 nm a fourth transmission minimum (MIN-4) having a transmission lower than 15%.

7. The lens of claim 6, wherein the fourth transmission minimum (MIN-4) is located between 490 nm and 510 nm.

8. The lens of claim 6, wherein the fourth transmission minimum (MIN-4) is located between 520 and 540 nm.

9. The lens of claim 6, wherein the transmission of the fourth transmission minimum is higher than the transmission of the first and of the second transmission minimum (MIN-1, MIN-2).

10. The lens of claim 6, wherein the spectrum comprises between the fourth transmission minimum (MIN-4) and the second transmission minimum (MIN-2) a fourth transmission maximum (MAX-4) having a transmission comprised between 10% and 60%.

11. The lens of claim 1, wherein the spectrum comprises in the wavelength range comprised between 440 nm and 480 nm a third transmission maximum (MAX-3) having a transmission higher than 15%.

12. The lens of claim 1, wherein the transmission of the third transmission minimum (MIN-3) possesses a transmission lower than or equal to 75% of the transmission value of the second transmission maximum (MAX-2).

13. The lens of claim 1, wherein the transmission of the second transmission minimum (MIN-2) is lower than the transmission of the third transmission minimum (MIN-3).

14. The lens of claim 1, wherein the transmission of the first transmission minimum (MIN-1) is lower than or equal to the transmission of the second transmission minimum (MIN-2).

15. The lens of claim 1, wherein the width of an absorption peak formed by the first transmission minimum (MIN-1) when measured at a transmission value corresponding to twice the transmission value of the first transmission minimum (MIN-1) is comprised between 10 nm and 20 nm.

16. The lens of claim 1, wherein the width of an absorption peak formed by the second transmission minimum (MIN-2) at a transmission value corresponding to twice the transmission value of the second transmission minimum is comprised between 15 nm and 30 nm.

17. The lens of claim 1, wherein the second transmission minimum (MIN-2) and the third transmission minimum (MIN-3) are separated by 30 nm to 60 nm.

18. The lens of claim 17, wherein the second transmission minimum (MIN-2) and the third transmission minimum (MIN-3) are separated 45 nm.

19. The lens of claim 1, wherein the transmission between 440 nm and 480 nm is higher than 20%.

20. The lens of claim 1, wherein the transmission between 480 nm and 510 nm is comprised between 10% and 40%.

* * * * *